Jan. 25, 1955 H. W. NORDYKE, JR 2,700,703
MAGNETIC REPRODUCER
Filed Dec. 29, 1950

Inventor
HORACE WILLIAM NORDYKE, JR.
By John B. Sponsler
AGENT.

United States Patent Office 2,700,703

Patented Jan. 25, 1955

2,700,703

MAGNETIC REPRODUCER

Horace William Nordyke, Jr., Poughkeepsie, N. Y., assignor to International Business Machines Corporation, New York, N. Y., a corporation of New York Application December 29, 1950, Serial No. 203,467

7 Claims. (Cl. 179—100.2)

This invention relates to magnetic recording devices, and primarily to means and apparatus for reproducing magnetically recorded signals sensed from magnetized media such as tapes, cores and wires.

It is common practice in magnetic recording to record impulses, variations of impulses, or magnetic voice and sound recordings upon media such as tapes having magnetic properties. Normally such recording is accomplished by passing the tape past a recording coil, the rate of the tape travel being predetermined so that when a reproduction of the magnetic recording upon the tape is desired, the tape may be passed under another coil, known as a reproducing coil, wherefrom induced voltages resulting from the magnetic field of the recording on the tape are produced. This follows along the well-known electromagnetic principle that the voltage induced in a coil or a winding is directly proportioned to the rate of change of magnetic flux. It is also quite possible to make recordings upon magnetic tape, or similar media, by subjecting the tape to a magnetic field while the tape is stationary, if only impulses are desired to be recorded. Normally, however, even with this type of recording, it is necessary in order to reproduce the aforementioned impulses that the tape be passed at some velocity under a reproducing winding or coil in order that an induced voltage impulse may be secured representative of the magnetic impulse which was recorded.

In the present invention, apparatus has been developed whereby magnetic impulses recorded, either upon a moving tape or a stationary tape or other magnetized media can be sensed electro-magnetically and reproduced electrically without relative motion between the magnetic media and the reproducing coil or winding.

It is an object of this invention therefore to provide apparatus whereby a magnetic recording can be sensed directly from the magnetizable media, without erasing the stored information, by means of a stationary sensing device without moving the magnetic media relative to the aforesaid device.

It is a further object of this invention to provide a simple and improved magnetic sensing device wherein the magnetic pattern in a magnetized material may be statically determined.

Other objects of the invention will be pointed out in the following description and claims and illustrated in the accompanying drawings, which disclose, by way of example, the principle of the invention and the best mode, which has been contemplated, of applying that principle.

Figure 1:
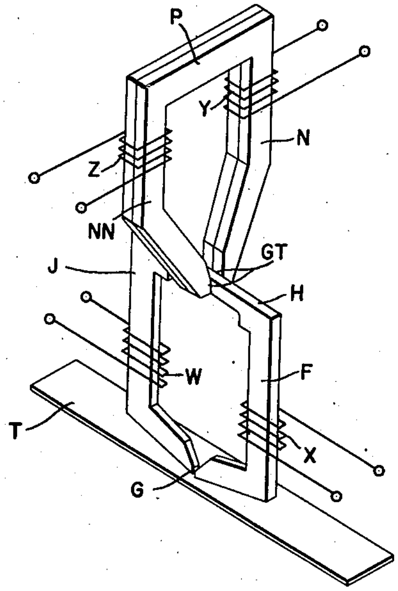
Fig. 1 is an isometric drawing of one form of invention illustrating schematically the novel arrangement of the reproducing coil or winding.

Now referring to Fig. 1, a magnetic reproducing winding and core assembly is shown for reading signals magnetically recorded upon a tape T. The assembly comprises the core members J and F which are connected at one end by another core member H, and at their lower extremities are separated by an air gap G into which the flux of a magnetic recording upon the tape T is introduced. In normal practice, it is obvious that if the tape T contained magnetically recorded impulses, and the tape T were moved across the gap G, voltages would be induced into each of a pair of windings W and X upon the core members J and F, respectively. In the present invention, however, it being unnecessary for the tape T to move in order to provide a reproduction of a magnetically recorded impulse in the aforementioned tape T, a further magnetic component is required. This component is comprised of a further magnetic core and coil assembly having the core members N and NN each connected at its end by a further core member P, and at the lower ends of core members N and NN forming a gap GT into which the core member H of the first-mentioned core and winding assembly is fitted. The core members N and NN respectively are provided with windings Y and Z.

It is obvious that if the windings Y and Z are energized a magnetic flux will be produced in the core members N, P and NN such that the core member H will be magnetically affected by virtue of its occupying the gap GT. It is also obvious that this magnetic flux will occur whether the voltage energizing the windings Y and Z is uni-directional or alternating. In the core and winding assembly having the cores J and F and the windings W and X respectively, the flux maintained in the core or generated by any external source will be directly proportional to the magnetomotive force and inversely proportional to the reluctance of the core path. Furthermore, the voltages induced by changing flux through the windings W and X will be directly proportional to the rate of change of magnetic flux. Consequently, when a magnetized spot, or magnetically recorded impulse in the tape T, for example, is placed at the air gap G, a constant magnetomotive force will be applied to the core and winding assembly having the core members J, H and F. However since there is no motion of the tape T relative to the core assembly JHF, no voltage is induced in the coils W and X, there being a zero rate of change of magnetic flux in this core path. Now however, if a varying unidirectional or alternating voltage is applied to the windings Y and Z of the core and winding assembly NPNN so that core member H occupying the gap GT is cross magnetized by constantly varying flux, the effective reluctance of core member H will be changed proportionately providing the flux produced by the varying unidirectional or alternating current excited windings is sufficiently strong. Therefore in the core and winding assembly JHF, while the magnetomotive force in the magnetic circuit JHF is constant, nevertheless, the effective reluctance of that core is varying alternately so that the resultant flux to the windings W and X which is directly proportional to the magnetomotive force and inversely proportional to the reluctance of the magnetic path induces a voltage in the windings W and X proportional to the strength and direction of the magnetomotive force represented by the magnetically recorded impulse in the tape T at the air gap G. It is obvious that if no magnetically recorded spot for providing a magnetomotive force at the gap G is present, or if no residual magnetism is present in the core, no flux will be produced in the core path JHF and consequently no voltage induced in the windings W and X even though the effective reluctance of the core member H is alternately varying due to the transverse or quadrature flux presented in core N—P—NN.

From the above, it is readily understandable that a magnetic spot or magnetically recorded impulse in the tape T cannot only be detected but its intensity measured, and also its direction indicated, by means of the voltage induced in the windings W and X as has just been described.

In practical application of the device just described, no motion of the tape T is necessary in order to produce output voltages in the windings W and X. It is necessary, however, that a varying current be passed through the windings Z and Y of such magnitude sufficient to cause a change in the effective reluctance of the core member H. Having fulfilled this condition, a constant magnetomotive force applied in the gap G will produce by virtue of the changing flux, which is in turn brought about by the changing effective reluctance of the core member H so that voltages are induced in the windings W and X, If a non-magnetized portion of the tape T occupies the gap G, no variation in the flux of the core JHF will be obtained and consequently no voltage will be induced in the windings W and X. In actual practice, residual effects and stray pickup from the alternating flux of the core NPNN may produce a small voltage in the windings W and X when there is no magnetomotive force present at the gap G; however, when a magnetized portion of the tape T is placed at the gap G, a very much greater voltage will be induced in the windings W and X.

In the construction of the device of Fig. 1, the plane of the core NPNN is made to be right angles with the plane of the core JHF so that the controlling flux produced in core NPNN is in quadrature with that to which core JHF is subjected. The frequency of the varying voltage applied to the windings Z and Y normally should be quite high so that a very small magnetized portion of the tape T when placed at gap G will be properly sensed as the magnitude of the induced voltage in the output windings X and W is proportional to the variation of reluctance of the magnetic circuit. If the reluctance of the core JHF is changed in a particular way, that is if the variation in reluctance is made at a greater rate when decreasing as compared with the rate when increasing, or vice versa, the core may be made sensitive to the polarity of a magnetized spot in tape T as well as its magnitude. In effect, the induced voltages in W and X, after being filtered by a proper low pass filter for removing the stay effects of the varying voltage which is applied to the windings Z and Y, are proportional to the magnitude and direction of the magnetomotive force of the particular magnetized portion of the tape T which is being sensed at gap G.

It is understood, of course, that the induced voltages in the windings W and X may be amplified by conventional amplifiers well-known in the art, and that the varying unidirectional or alternating voltage applied to the windings Z and Y may be generated in many ways which are well known in the art. These matters, being no part of the present invention, are not described herein.

Figure 2:
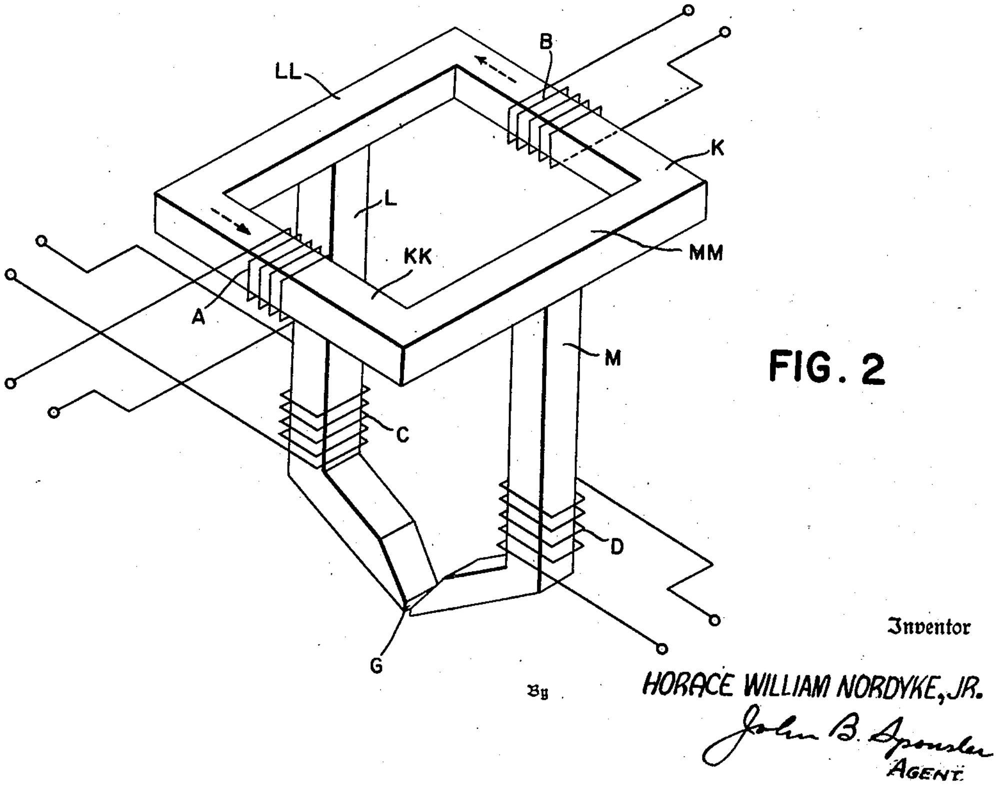
Fig. 2 is another form of invention, and is an isometric drawing including a balanced magnetic structure capable of yielding more efficient results in the reproduction of magnetically recorded signals.

Referring now to Fig. 2, another form of the invention is illustrated. The structure of Fig. 2 is proved to have a greater percentage change in effective reluctance than that shown in Fig. 1; consequently, the sensitivity of the device is greatly enhanced. In Fig. 2, a core member L and a core member M are arranged in such a way as to have the gap G at their lower extremities. Two windings C and D respectively are wound upon the core members L and M. At the upper extremity of the core members L and M, they are joined by a core structure K, LL, KK, MM. The upper core structure contains windings A and B respectively applied to the portions KK and K. This construction provides a type of magnetic bridge circuit, and since, with respect to the lower core structure (including core members L and M), both core paths of the upper core structure carrying the windings A and B are included, a magnetic flux balance is secured relative to the alternating voltages applied to A and B tending to provide less interference from stray pickup by the windings C and D. The resultant alternating current flux produced in the upper core structure (that is the core defined by the members K, LL, KK and MM) is indicated by the broken arrows placed thereon. In the construction of the device of Fig. 2, it is important that the plane of the upper core be at right angles to the plane of the partial core comprised of the core members L and M. In operation, the structure of Fig. 2 follows along the same principles as that of Fig. 1 in that the reluctance of the primary magnetic circuit is controlled and varied; however, due to the construction of the upper core the alternating voltages reflected into the windings C and D will be cancelled out although the change in effective reluctance of the magnetic circuit including core members L and M will be effected in a manner similar to that of the structure of Fig. 1.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. A magnetic reproducing device for sensing the presence of a given magnetomotive force recorded in a magnetizable medium, comprising a first magnetic core so related to said medium as to be subjected to the magnetomotive force recorded therein, a second magnetic core, magnetizing means associated with said second core for inducing a variable magnetic flux therein, means comprising a core section common to both said cores and defining a variable-reluctance path for magnetic flux induced by said magnetomotive force wherein a first portion of said flux path is cross magnetized by a substantial portion of the variable flux in said second core thereby to vary the effective reluctance of said path with respect to said magnetomotive force and in which a second portion of said flux path is substantially free of the variable flux in said second core, and an output winding inductively coupled to the second portion of said path for producing a variable output voltage indicating the presence of said magnetomotive force as said variable magnetizing means causes the effective reluctance of said common section to vary.

2. A static magnetic sensing device comprising a first magnetic circuit subjected to a static flux condition, a second magnetic circuit having a portion common to said first magnetic circuit wherein the flux produced in said circuits is substantially at right angles, a winding on said second magnetic circuit, a source of variable current coupled to said winding for producing a variable magnetic flux in said second magnetic circuit and thereby varying the effective reluctance of the portion common to both magnetic circuits, an output winding on said first magnetic circuit in which a voltage is induced indicative of the magnitude and direction of a static flux condition in said first magnetic circuit as the effective reluctance of said common portion is varied.

3. A primary magnetic circuit having a magnetomotive force, a second magnetic circuit having a portion common to said primary magnetic circuit, means producing a controlled flux field in said second magnetic circuit substantially at right angles to flux existing in said common portion due to said primary magnetic circuit, said controlled flux varying the effective reluctance of said primary magnetic circuit and thus causing the flux produced by said magnetomotive force to vary, a winding on said primary magnetic circuit in which a voltage is induced dependent upon the rate of change of said controlled flux field and the polarity and magnitude of the magnetomotive force of said primary magnetic circuit.

4. A static magnetic sensing device comprising a first magnetic circuit in which a stable flux condition exists, a second magnetic circuit joined to said first magnetic circuit so that a portion of each is common and the flux in each circuit is in a substantially transverse relationship in said common portion, a winding on said second magnetic circuit, a variable energy source coupled to said winding and operable to cause a variable flux to be produced in said second magnetic circuit to thereby vary the effective reluctance of said common portion, and an output winding on said first magnetic circuit in which a voltage is induced when a stable flux condition exists in said first magnetic circuit and the reluctance of said common portion is varied.

5. A magnetic sensing device comprising at least one first magnetic circuit in which a stable flux condition may exist, a second magnetic circuit, means including a portion common to said first and second magnetic circuits wherein their flux paths are in a substantially transverse relationship, a winding on said second magnetic circuit, a source of variable electrical energy coupled to said winding so as to produce a variable flux in said second magnetic circuit and thereby vary the effective reluctance of said common portion, an output winding on said first magnetic circuit in which a voltage is induced when a flux condition exists in said first magnetic circuit and the reluctance of said common portion is varied.

6. A static magnetic sensing device comprising a first magnetic circuit in which a stable flux condition may exist, a second magnetic circuit, means joining said magnetic circuits so that a portion of each is common and the flux in each circuit is in a substantially transverse relationship in said common portion, a winding on said second magnetic circuit, means including a variable energy source coupled to said winding and operable to cause a flux variable at a controlled non-uniform rate to be produced in said second magnetic circuit to thereby vary the effective reluctance of said common core portion in like maner, and an output winding on said first magnetic circuit in which a voltage is induced when a flux condition exists in said first magnetic circuit and the reluctance of said common portion is varied, said voltage being indicative of the magnitude and direction of said flux condition.

7. A magnetic reproducing device comprising a pair of magnetic cores, means comprising a core section common to each of said cores wherein flux produced in said cores is substantially at right angles, a winding on each core, one of the said cores having an air gap remote from said common section whereat a static magnetomotive force produces an induced representative voltage in the winding of said one core when a varying voltage is applied to the winding of the other said core and produces a controlling flux in quadrature with that resulting from said magnetomotive force.

References Cited in the file of this patent

UNITED STATES PATENTS

| | | |
|---|---|---|
| 2,423,339 | Newman | July 1, 1947 |
| 2,424,295 | Williams | July 22, 1947 |
| 2,536,260 | Burns | Jan. 2, 1951 |
| 2,608,621 | Peterson | Aug. 26, 1952 |